N° 65,705.

Levi Stevens' Apparatus for Treating Air and Hydrocarbon Vapor for Illuminating Gas.

Edw. F. Brown.
C. Bestor.
Witnesses.

Levi Stevens
Inventor.

United States Patent Office.

LEVI STEVENS, OF FITCHBURG, MASSACHUSETTS.

Letters Patent No. 65,705, dated June 11, 1867.

---

IMPROVED APPARATUS FOR TREATING AIR AND HYDROCARBON VAPOR FOR ILLUMINATING GAS.

---

The Schedule referred to in these Letters Patent and making part of the same.

---

Be it known that I, LEVI STEVENS, of Fitchburg, in the county of Worcester, and Commonwealth of Massachusetts, have invented a new and useful Apparatus for Treating Air and Hydrocarbon Vapor for Illuminating Gas; and I do hereby declare that the following is a full, clear, and exact description of the construction and operation of the same, reference being had to the annexed drawings, making a part of this specification, in which—

The same letters used in the different figures represent the same parts.

Figure 1:
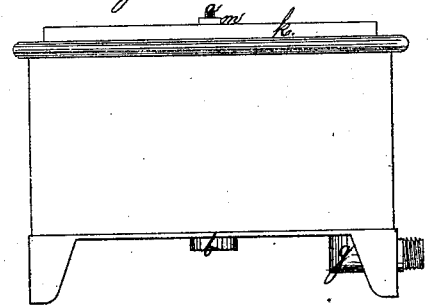
Figure 1 represents a side view of the machine.
Figure 2:
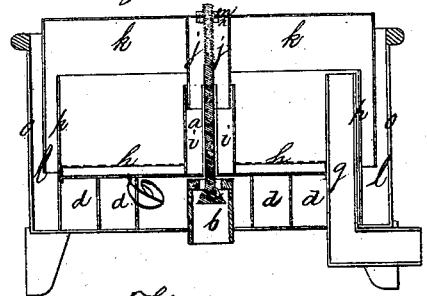
Figure 2 is a vertical section.
Figure 3:
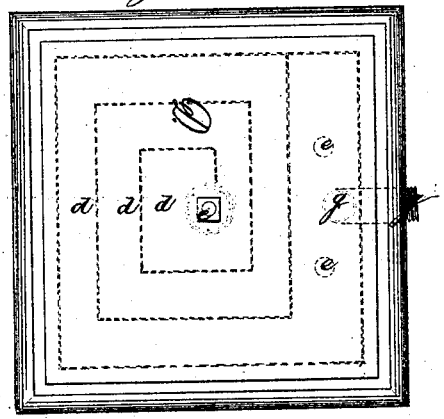
Figure 3 is a metallic plate, with an involute or worm $d\ d$ on its lower surface through which the air or gas is forced as is hereinafter described.

The letters $o\ o$ represent the outer case of the machine, and $p\ p$ the inner case. The cases are joined at the bottom, and the space between is to be filled or partly filled with water for trapping the air or gas as hereinafter described. $k\ k$ is a float so constructed as to rest in the water between the cases $o\ o$ and $p\ p$. This float is firmly connected with the rod $a$ by the two nuts $m$ and $n$, so that the rod $a$ rises and falls with the float $k\ k$. Air or gas is forced into the machine through the pipe $b$. On the lower part of the rod $a$ is a head, $c$. As air or gas is forced into the machine the float $k\ k$ rises, and the head $c$ is thereby brought against the upper part of the tube $b$, and the aperture is closed entirely. As the gas or air is drawn off through the delivery pipe $g$ the float falls, and the rod at the head $c$ falls away from the shoulder of the tube $b$, and the air or gas passes into the chamber above, the float is again raised, and the aperture closed. The gas or air passing through the pipe $b$ is admitted within or under the plate D. The chamber formed by the case $p\ p$ contains a suitable quantity of alcohol, spirits of turpentine, or other proper material. The air or gas is passed through the involute or worm $d\ d$ over the alcohol or other material, and is finally delivered through the openings $e\ e$ into the space between the top of the plate D and the lower side of the pan $h\ h$. The bottom of the pan $h\ h$ is perforated with numerous holes for the passage of the air or gas. Within the pan is placed a quantity of lime, calcined plaster, or other material, through which the air or gas passes into the space above. The office of the lime or other material is to deprive the air or gas of any foreign substance, and especially to deprive it of the moisture, so as to render it more suitable for combustion. To the top of the plate D is attached a cylinder, $i\ i$, and a similar but smaller cylinder $j\ j$ is attached to the under side of the float $k\ k$. The cylinder $i\ i$ contains a quantity of water, which, in combination with the cylinder tubes $i\ i$ and $j\ j$, serves to trap any gas or air which otherwise might escape between the rod $a$ and the case in which it is enclosed, as shown in the drawings. The pipe $g$ is the delivery pipe.

The apparatus herein described is designed for use in connection with machines for producing gas from gasoline or other forms of hydrocarbon; and it may be attached to such machines so as to prepare the air before it is introduced into the gas machine, or it may be so connected as to treat the gas after its manufacture and before its delivery for burning.

I claim the apparatus for treating air and hydrocarbon vapor for illuminating gas, substantially as described for the purposes specified.

I also claim the combination of the float $k\ k$ with the rod $a$, and head $c$, arranged substantially as described and for the purposes set forth.

I also claim the use of alcohol for improving the quality of gas for combustion, in combination with the use of lime, substantially as described and for the purposes set forth.

LEVI STEVENS.

Witnesses:
EDM. F. BROWN,
C. BESTOR.